May 24, 1966  W. H. GOETTL  3,252,508
COMBINATION AIR CONDITIONER
Filed Feb. 12, 1962  2 Sheets-Sheet 1
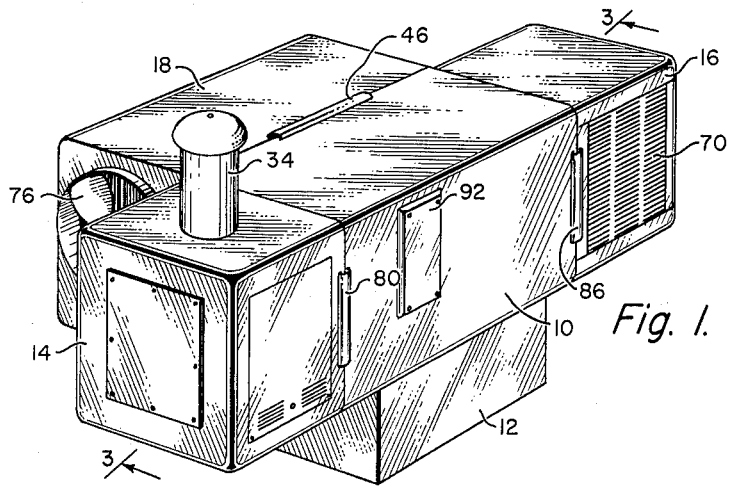
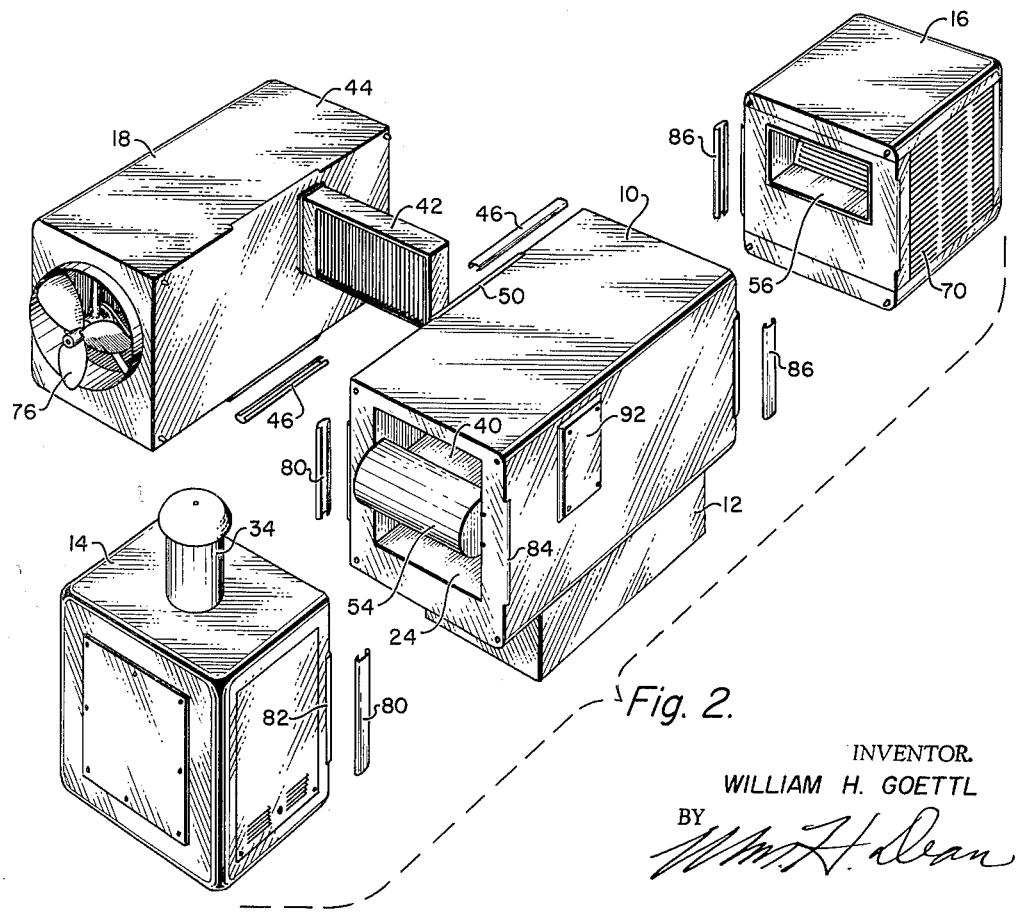
INVENTOR.
WILLIAM H. GOETTL May 24, 1966 W. H. GOETTL 3,252,508
COMBINATION AIR CONDITIONER
Filed Feb. 12, 1962 2 Sheets-Sheet 2

INVENTOR.
WILLIAM H. GOETTL
BY

United States Patent Office 3,252,508
Patented May 24, 1966

3,252,508
COMBINATION AIR CONDITIONER
William H. Goettl, 4627 N. Granite Reef Road,
Scottsdale, Ariz.
Filed Feb. 12, 1962, Ser. No. 172,565
14 Claims. (Cl. 165—48)

This invention relates to a combination air conditioner and more particularly to a combination air conditioner which comprises a very compact arrangement of heating, refrigeration and evaporative cooling equipment, all coupled to a common air delivery and return duct system.

It has been recognized that a complete air conditioning system, in order to be ideal in some climates, should include heating, refrigeration and evaporative cooling. Heretofore, these three air conditioning functions have been utilized, either separately or in quite complex ducting and control arrangements relative to each other for air conditioning of a common dwelling. In many instances, home builders have been frustrated, particularly in the building of tract homes, due to the fact that some of them will be equipped with heating and refrigeration, others with heating and evaporative cooling and still others may require all three air conditioning functions. Decisions as to these combinations may be made at the time homes or buildings are purchased or at times when these units may be rented. Thus, a central system employing all three functions, namely, heating, refrigeration and evaporative cooling, has always been desirable in many climates and from a building standpoint, as well as a rental standpoint, it has always been a problem to predetermine the air conditioning requirements with respect to all three of these air conditioning functions and to plan the building accordingly.

It has further been recognized that it would be highly desirable to provide a building with an air conditioning system wherein heating may be a basic part of the system and wherein evaporative cooling and refrigeration may be optional or alternately used. In some instances, refrigeration is considerably more costly than evaporative cooling and accordingly the economy factor has a great bearing on the desired installation of refrigeration relative to evaporative cooling. On the other hand, during relatively dry hot weather, evaporative cooling has advantages over refrigeration and is more economical to operate and maintain. Consequently, it is desirable in many installations to have evaporative cooling and refrigeration readily available so that evaporative cooling may be utilized during hot, dry periods of the summer season, while the refrigeration is readily available whenever humidity increases to a predetermined amount during such hot weather.

It has been a problem for builders and air conditioning vendors to supply a combination air conditioning system which is compact and yet which includes heating, refrigeration and evaporative cooling and wherein the refrigeration and evaporative cooling is readily optional and may be removed or installed with facility and within a very short length of time. Furthermore, it has been a problem, economically to equip a building with an air conditioning system wherein heating, refrigeration and evaporative cooling may all be available at the same time or wherein the refrigeration and evaporative cooling is optional and readily exchangeable.

Accordingly, it is an object of the present invention to provide a combination air conditioner which is very compact, very economical, very easy to install in buildings and which includes heating, refrigeration and evaporative cooling, or wherein the refrigeration or evaporative cooling may be optional or readily exchangeable within a short period of time.

Another object of the invention is to provide a combination air conditioning system having a novel arrangement of a blower, a heater and a refrigeration evaporator, whereby the blower delivers air into the heater to be heated at one side of the heater and the air goes through the heater and passes backwardly out the same side of the heater and moves through said evaporator whereby the same blower may readily be used to operate the heater or the refrigeration evaporator and whereby, the structure of the heater, blower and evaporator is extremely compact, since the air passing in the heater and out of the heater is all ducted at the same side thereof.

Another object of the invention is to provide a novel blower and heater arrangement wherein air from the blower enters one side of the heater and passes inwardly at the lower burner ends of the heat exchange tubes and then passes upwardly in a substantially 180 degree arcuate path and outwardly at the same side of the heater at which the blower delivers air thereinto.

Another object of the invention is to provide a novel arrangement wherein a heater receives air at one side thereof, at the lower ends of the burner heat exchange tubes, so that the cold air entering the heater tends to cool the tubes at their critical temperature areas and whereupon the initially warmed air passes through the tubes in a substantially 180 degree arcuate path so that the initially heated air, at the lower hot ends of the tubes, is further heated near the upper ends thereof before the air leaves the heater at the same side thereof and above the area at which it enters from the blower outlet.

Another object of the invention is to provide a novel combination air conditioner employing a heater and blower, a refrigeration evaporator and an evaporative cooler, all coupled to a common central housing having a delivery duct and a return air duct; said return air duct being coupled to the inlet of the blower furnishing air to the heater and the evaporator, while an evaporative cooler delivers air to the delivery duct and wherein an automatic pressure operated valve alternately controls the delivery of air from the evaporative cooler or from the heater in accordance with air pressure from the evaporative cooler or from the heater-blower, depending upon whichever unit is in operation.

Another object of the invention is to provide a combination air conditioner wherein a blower furnishes pressure air to a heater and an evaporator and wherein a common casing supports the heater, a refrigeration unit of the evaporator and an evaporative cooler, and wherein the refrigeration unit and evaporative cooler may alternately and readily be connected and disconnected from the casing, so that either or both units may be installed at the same time or may be optional, as desired.

Another object of the invention is to provide a combination air conditioner having a novel blower and heater system coupled to a central casing which also has an evaporative cooler coupled thereto and wherein an opening is provided in the side of the casing to receive a removable evaporator of a refrigeration unit; said refrigeration unit having a housing enclosing all of the refrigeration system except the evaporator which projects from the housing and through the opening into the casing into an air flow path of air passing from the heater-blower to the air delivery duct of the casing.

Another object of the invention is to provide a combination air conditioner having a novel arrangement of a blower, a heater and a refrigeration evaporator, together with a baffle means at the outlet of the blower disposed to divide the flow of air from the blower so that part of the air passes through the heater and part of its passes directly to said evaporator whereby a balance of air flow, with respect to the capacities of the heater and the evaporator, may be attained in various areas having various temperature conditions throughout the summer and winter seasons.

Another object of the invention is to provide a novel combination air conditioner having a blower, heater, refrigeration evaporator and evaporative cooler wherein a novel air pressure operated damper is disposed alternately to control and/or shut off flow of air through and from the evaporator and the evaporative cooler; said damper provided with detent means disposed to hold the same in position alternately to shut off flow from the evaporative cooler or the refrigeration evaporator, depending upon the use of one or the other in the air conditioner.

Further objects and advantages of the invention may be apparent from the following specification, appended claims and accompanying drawings, in which:

FIG. 1 is a perspective view of a combination air conditioner in accordance with the present invention;

FIG. 2 is a perspective exploded view of a combination air conditioner, in accordance with the present invention;

Figure 3:
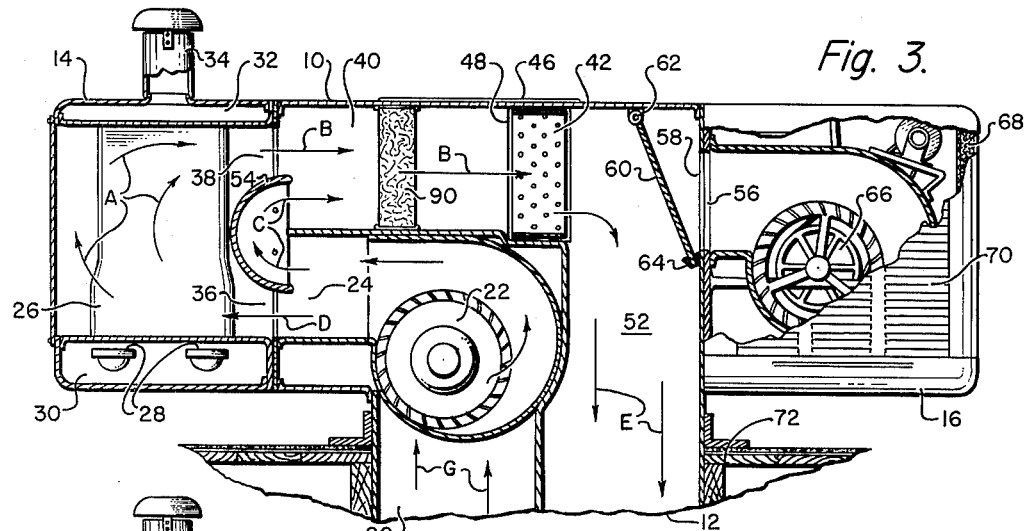
FIG. 3 is a sectional view taken from the line 3—3 of FIG. 1, showing parts and portions in elevation to amplify the illustration.

As shown in FIG. 1 of the drawings, the combination air conditioner of the invention is provided with a central casing 10 having a duct section 12, as will be hereinafter described. Coupled to one end of the casing section 10 is a heater 14. Coupled to the opposite end of the casing section 10 is an evaporative cooler 16 and coupled to one side of the casing section 10 is a refrigeration system 18.

As shown in FIG. 3 of the drawings, the central casing means or section 10 is provided with an air return duct 20 which returns air from a building room to the inlet of a blower 22 having an outlet 24 which communicates directly with conventional heat exchange tubes of the heater 14. These tubes 26 are hollow tubes disposed to conduct hot gas upwardly therethrough from burners 28, in a burner compartment 30, at the lower portion of the heater. The heat exchange tubes 26 have outer surfaces and their upper open ends communicate with a plenum 32 and a flue gas outlet conduit 34, the length of which is determined by the installation in a building. In conventional heaters, such as the heater 14, there are a plurality of vertical heat exchange tubes 26 having heat exchange surfaces and air passing from the blower 22 through the outlet 24 is forced into an inlet 36 of the heater between the heat exchange surfaces of the tubes 26 and the air, as indicated by arrows A, passes into the inlet 36, makes a substantially 180 degree change in direction and passes outwardly through an outlet 38 of the heater, whereupon the air passes as indicated by arrows B in an air passage 40 of the casing 10. Disposed in this passage 40, in the path of the air flow, as indicated by the arrows B, is a refrigeration evaporator 42, which projects from a housing 44 of the refrigeration system 18, all as shown best in FIGS. 2 and 3 of the drawings. The housing 44 is coupled to the central casing 10 by means of channel clips 46 which hold the housing 44 contiguous to the casing 10 and hold the projecting evaporator 42 in an opening 48 in the side wall of the casing 10 and communicating with the passage 40. It will be appreciated by those skilled in the art that the clips 46 permit the housing 44 and the evaporator 42 to be readily removed from the passage 40 and that a plate may cover the opening 48 and be secured thereon by the clips 46 or flanges on a plate cooperating with a complemental flange 50, at each end of the opening 48. Thus, the refrigeration system 18 may readily be connected or disconnected from the housing 10 to dispose the evaporator 42 in the path of air flowing from the blower 22 via the heater 14.

It will be appreciated that air passing in and out of the same side of the heater 14 permits the heater to be very compactly coupled with the passage 40 leading to the evaporator 42 which communicates directly with an air delivery passage 52 of the casing 10. It may be said that the passage 40 also comprises a part of the air delivery duct 52 which is diposed at right angles to the air flow as indicated by the arrows B in FIG. 3 of the drawings.

An arcuate baffle 54 is disposed at the outlet 24 of the blower 22 in order to divert part of the air, passing from the blower 22, as indicated by arrows C, in FIG. 3 of the drawings, directly to the passage 40 and the evaporator 42 without passing through the heater 14. The rest of the air, as indicated by an arrow D, passes directly through the heater.

Figure 4:
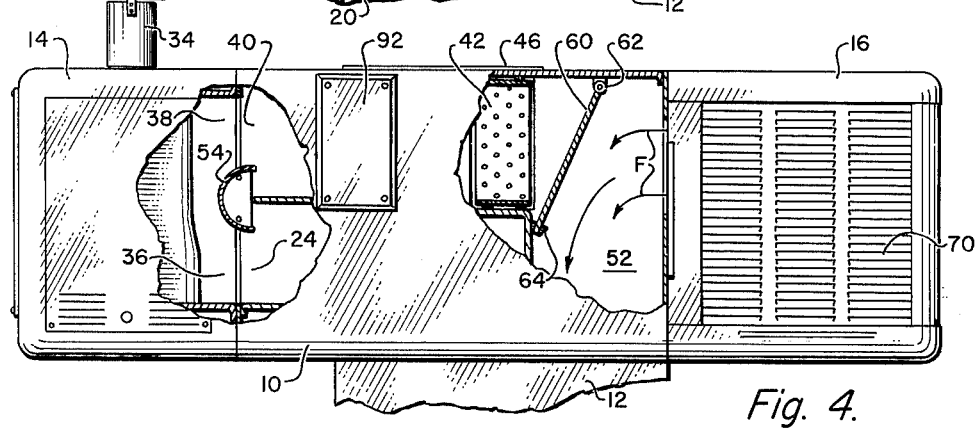
FIG. 4 is a side elevational view of a combination air conditioner, in accordance with the present invention, showing portions thereof broken away and in section to amplify the illustration.

As shown in FIGS. 3 and 4, the size and capacity of the baffle 54 may be varied to vary the proportions of air passing from the blower through the heater and directly from the blower into the passage 40, respectively.

Coupled to the opposite end of the casing 10, from the heater 14, is the evaporative cooler 16, which is provided with an outlet 56 communicating directly with an opening 58 in the air delivery duct 52. A damper 60 is pivoted at 62 in order to swing from the position, as shown in FIG. 3, to the position, as shown in FIG. 4.

Magnetic detents 64, on the free end of the damper, tend to hold it in alternate positions, as will be hereinafter described, due to magnetic attraction of the magnet 64 relative to the side walls of the air delivery duct 52.

When the damper 60 is in the position, as shown in FIG. 3 of the drawings, it shuts off communcation with the opening 58 and the evaporative cooler outlet 56, thereby permitting air to flow from the passage 40 into the air delivery duct 52 and to either supply heated air or refrigerated air, depending upon whether or not the heater 14 or the evaporator 42 is energized, respectively.

It will be seen that the damper 60 is a pressure operated damper and is automatically moved to the position shown in FIG. 3 when air pressure, acting in the duct 40, forces the damper to pivot to the position shown in FIG. 3, thereby automatically providing egress for the passage 40 into the air delivery duct 52 and into a building room, as indicated by arrows E, in FIG. 3 of the drawings.

When the blower 22 is inoperative and the evaporative cooling only is needed, a blower 66 of the evaporative cooler 16 delivers air, as indicated by arrows F, in FIG. 4 of the drawings, which forces the damper 60 to the position as shown in FIG. 4 of the drawings, thereby shutting off communication of the air delivery duct 52 relative to the passage 40. Thus, all of the air passes from the evaporative cooler 16 directly to the air delivery duct 52.

It will be recognized by those skilled in the art that the evaporative cooler 16 is a conventional evaporative cooler having conventional wet pads 68 through which air passes from louvers 70 due to the movement of air therethrough by the blower 66.

The duct section 12 of the casing 10 extends downwardly through a conventional roof structure 72 of a dwelling, whereby the combination air conditioner of the invention may be disposed on a roof, or if desired, ducts may be connected to the return duct 20 and delivery duct 52 at right angles to that as shown in FIG. 3, so that a side delivery of the present air conditioner may be accomplished in order to place the air conditioner at the ends of horizontally disposed ducts and at the end of a building or the like.

Figure 5:
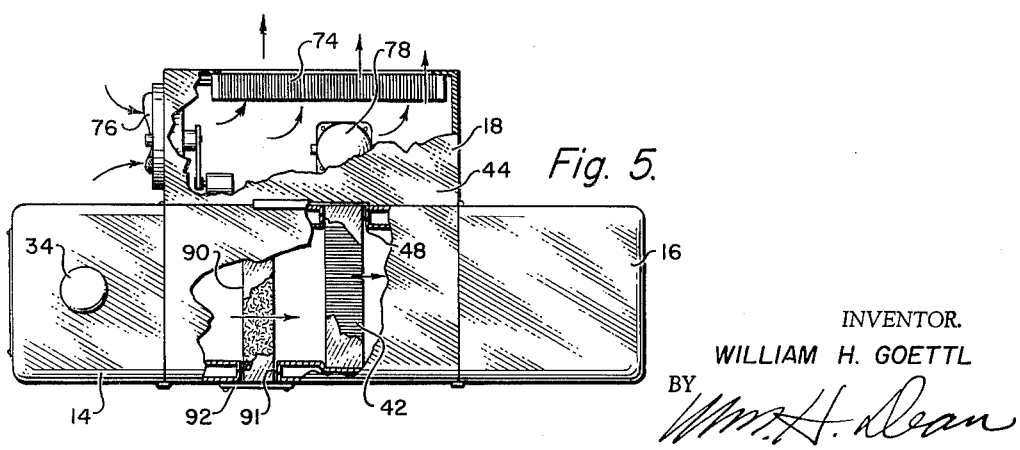
FIG. 5 is a reduced plan view of a combination air conditioner, in accordance with the present invention, and showing portions thereof broken away and in section.

As shown in FIG. 5 of the drawings, the refrigeration system 18, in the housing 44 is provided with a conventional refrigerant condenser 74, a fan or blower 76, a compressor 78 and the evaporator 42, hereinbefore described.

It will be seen from FIG. 2 of the drawings, that the heater 14 may be connected to the casing 10 by conventional channel-shaped clips 80 which cooperate with clip flanges 82 and 84 on the heater 14 and casing 10 and that the evaporative cooler may likewise be secured to the casing 10 by means of conventional channel-shaped clips 86.

If it is desired to replace the heater 14, the clips 80 may be very quickly removed and a new heater disposed in position and locked to the casing 10 by means of the clips 80.

Other similar means may be utilized, as desired, and it will be obvious to those skilled in the art that in addition to the clips 86, suitable bolts and screws may be used to lock these units in position. Additionally, it will be understood that the channel clips 80 and 86 may be either in a horizontal or vertical disposition, as desired, depending upon the construction.

When it is desired to utilize the combination air conditioner of the invention, as a heater only, the heater 14 is energized and the blower 22 is put into operation. Air then flows through the outlet 24 of the blower, part of it going through the heat exchange surfaces of the heater, in a substantially U-shaped path, making a turn of substantially 180 degrees and passing outwardly through the passage 40 from the same side of the heater as it enters, the heated air then goes through the evaporator 42, which is de-energized, and forces the damper 60 into the position, as shown in FIG. 3. The air passes into the room through the air delivery ducts 52 in the direction of the arrows E. Return air passes into the blower inlet, as indicated by arrows G, through the return duct 20.

When it is desired to utilize the air conditioner as a refrigerator, the blower 22 is energized, the heater 14 is de-energized and the refrigeration system 18 is energized thereby cooling the evaporator 42 and causing air passing through the duct 40 and through the evaporator 42 to be cooled and delivered in the direction, as indicated by the arrows C.

When it is desired to use the air conditioner of the invention as an evaporative cooler, the blower 22 is de-energized, the heater 14 is de-energized and the refrigeration system 18 is de-energized and the evaporative cooler 16 is energized by initiating operation of the blower 66. Thus, air is delivered by the evaporative cooler in the direction of the arrows F, which forces the damper 60 to the position as shown in FIG. 4 of the drawings, and thereby delivering evaporatively cooled air to a room through the delivery duct 52.

Air is not returned to the evaporative cooler since it is very economically operated by permitting the air delivered through the delivery duct 52 to pass outwardly of the building and to the atmosphere.

In the operation of the blower 22 and the heater 14, it will be recognized by those skilled in the art that the air delivered to the heater 14, at the inlet 36 thereof, passes through the lower area of the heater adjacent the burners 28 where the tubes are at their highest temperatures. Thus, these heat exchange tubes are operated at a nominal temperature due to rapid cooling thereof and then the air initially heated at the hotter or higher temperature area of the heater passes upwardly and scrubs the uppermost surfaces of the heat exchange tubes before it leaves the heater from the same side as it enters, as hereinbefore described.

The baffle 54, which divides the delivery of air from the blower 22, permits the blower to be of a capacity desired for operation of both the heater 14 and/or the evaporator 42, individually, and permits a varying amount of air to be passed directly to the evaporator 42 to mix with air passing through the heater. Thus, the air passing through the heater is delivered in an amount to operate the heater at highest efficiency and the blower is additionally then capable of providing a sufficient amount of air to properly operate the evaporator 42 when summer cooling is required. These proportions may vary depending upon the relative summer and winter temperatures and the required capacities of the blower, evaporator 42 and the heater 14.

Particular advantages of the invention are apparent to builders who build tract homes, rental buildings, apartments, apartment hotels, motels and other similar buildings. A group of such buildings may all be equipped with the casing 10 and the duct section 12, together with the return duct 20 and the delivery duct 52. The heater 14, refrigeration assembly 18 and the evaporative cooler 16 are all optionally connected to the casing 10. In most conventional installations, the heater 14 will be connected, as hereinbefore described, together with the blower 22 so that the normally optional equipment will be the refrigeration system and the evaporative cooler 16.

Depending upon the climate, it may be necessary to utilize a refrigeration system 18 or in extremely arid climates, evaporative cooler 16 may be sufficient. Since the evaporative cooler is more economical, it may be desirable to install it for reasons of economy since some people cannot afford the initial expense of the refrigeration system 18 or its operation.

Accordingly, a builder who installs the casing 10 and the related duct system in all of his buildings, may readily and easily install either the evaporative cooler 16 or the refrigeration system 18 merely by coupling the respective system to the casing 10.

It will be appreciated by those skilled in the art that in a rental apartment, an evaporative cooler may be connected to the casing 10 and a new tenant may require refrigeration. Accordingly, the evaporative cooler 16 may be quickly disconnected and a plate slidably inserted over the opening 58 and the refrigeration system 18 may quickly be installed by slidably positioning the evaporator 42 through the opening 48 to dispose the evaporator 42 in the passage 40. This entire operation of exchanging the refrigeration system 18 and the evaporative cooler 16 may involve less than an hour. Thus, these different type cooling units may be transferred from one unit to another, among several rental units, or the owner of a home, initially financially unable to enjoy refrigeration, may have installed an evaporative cooler 16. Later on, the evaporative cooler 16 may be removed or it may be retained while the refrigeration system may readily be installed by simply inserting the evaporator 42 through the opening 48. Thus, the homeowner may have heating, refrigeration and evaporative cooler all available without making any changes in the system whatsoever. Also, it will be appreciated by those skilled in the art that heating may be enjoyed during some months of the year, evaporative cooling may be enjoyed during the hot season when humidity is low, and that during the middle of the summer or during hot humid weather, the refrigeration system 18 may be energized appropriately.

As shown in FIGS. 1, 2, 3, 4 and 5, an air filter 90 may be projected through an opening 91 in the casing 10 and secured in place by conventional flange 92, supporting the filter 90 in the passage 40, upstream of the evaporator 42.

This filter is operated downstream of the heater 14 which may be a conventional gas-fired heater, electrical heater or a conventional heat pump refrigeration unit.

In the event the latter type heater is used, the unit 18 with its evaporator 42, may not be required and consequently may be disconnected from the casing 10.

As hereinbefore pointed out, this casing 10 with its optional connection of various heating and cooling and ventilating equipment, provides a builder with a facility which may be incorporated in buildings from an initial standpoint so that any combination of air conditioning equipment may be coupled thereto with great facility.

It will be obvious to those skilled in the art that various modifications of the present invention may be resorted

I claim:

1. In an air conditioner the combination of: a heater having heat exchange surfaces therein; a heater inlet at one side of said heater communicating with said surfaces and disposed to receive air to be heated; a blower having an inlet and an outlet and disposed to force air through said heater; a heater outlet at said one side of said heater and adjacent to said heater inlet whereby air forced through said heater makes a substantially 180 degree change in direction from said heater inlet to said heater outlet; a conditioned air delivery duct communicating with said heater outlet; a return duct communicating with said inlet of said blower; casing means forming an air passage between said heater outlet and said delivery duct; an evaporative cooler having a blower and an air delivery opening communicating directly with said delivery duct in opposed relation to said passage, whereby air delivered into said delivery duct by said evaporative cooler is disposed to exert pressure in a direction opposite to that of air moving through said passage to said delivery duct; and a pivoted pressure operated damper disposed between said air passage and said evaporative cooler delivery opening whereby said damper is automatically closed over said evaporative cooler delivery opening when said first mentioned blower is operating and said evaporative cooler is not operating and whereby said damper is held closed between said passage and said delivery duct by air pressure from said evaporative cooler blower when it is operating and when said first mentioned blower is not operating.

2. In an air conditioner the combination of: a heater having heat exchange surfaces therein; a heater inlet at one side of said heater communicating with said surfaces and disposed to receive air to be heated; a blower having an inlet and an outlet disposed to force air from its outlet into said heater inlet; a heater outlet at said one side of said heater and adjacent to said heater inlet whereby air forced into said heater through said heater inlet makes a substantially 180 degree change in direction from said heater inlet to said heater outlet; a conditioned air delivery duct communicating with said heater outlet; a return duct communicating with said inlet of said blower; casing means forming an air passage between said heater outlet and said delivery duct; refrigeration means communicating with said blower and said passage whereby air from said blower may be cooled when said heater is inoperative; an evaporative cooler having a blower and a delivery opening communicating with said delivery duct and movable air pressure operable means alternately disposed to shut off said delivery opening and said passage relative to said delivery duct when said first mentioned blower is shut off and when said last mentioned blower is operating.

3. In an air conditioner the combination of: a main casing; a heater having heat exchange surfaces therein; a heater inlet at one side of said heater communicating with said surfaces and disposed to receive air to be heated; a blower having an inlet and an outlet disposed to force air from its outlet into said heater inlet; a heater outlet at said one side of said heater and adjacent to said heater inlet whereby air forced into said heater through said heater inlet makes a substantially 180 degree change in direction about said surfaces and passes outwardly through said heater outlet; a conditioned air delivery duct in said main casing and communicating with said heater outlet; a return duct communicating with said inlet of said blower; casing means coupled to said heater forming said delivery duct; a refrigeration unit housing coupled to said casing means; a refrigeration system carried by said housing; an evaporator of said system projecting from said housing; said casing means having an opening therein, said evaporator projecting through said opening and disposed in said air delivery duct, whereby air from said blower may be cooled when said heater is inoperative; and an evaporative cooler coupled to said casing pan having a blower and a delivery opening communicating with said delivery duct and movable air pressure operable means alternately disposed to shut off said delivery opening and said air delivery duct relative to said delivery duct; said evaporative cooler coupled to said casing means.

4. In an air conditioner the combination of: a main casing; a heater having heat exchange surfaces therein; a heater inlet at one side of said heater communicating with said surfaces and disposed to receive air to be heated; a blower having an inlet and an outlet disposed to force air from its outlet into said heater inlet; a heater outlet at said one side of said heater and adjacent to said heater inlet whereby air forced into said heater through said heater inlet makes a substantially 180 degree change in direction about said surfaces and passes outwardly through said heater outlet; a conditioned air delivery duct in said main casing and communicating with said heater outlet; a return duct communicating with said inlet of said blower; casing means coupled to said heater forming said delivery duct; a refrigeration unit housing coupled to said casing means; a refrigeration system carried by said housing; an evaporator of said system projecting from said housing; said casing means having an opening therein, said evaporator projecting through said opening and disposed in said air delivery duct, whereby air from said blower may be cooled when said heater is inoperative; and an evaporative cooler coupled to said casing pan having a blower and a delivery opening communicating with said delivery duct and movable air pressure operable means alternately disposed to shut off said delivery opening and said air delivery duct relative to said delivery duct; said evaporative cooler coupled to said casing means; said heater and said evaporative cooler being opposed to each other at opposite ends of said casing means respectively, and said refrigeration system housing being at one vertical side of said casing means.

5. In an air conditioner the combination of: a central casing; a conditioned air delivery duct therein; a blower having an inlet and an outlet; an air return duct communicating with said inlet of said blower, said blower outlet disposed at a first wall of said casing; a heater coupled to said casing and adjacent said first wall, said heater having an inlet at said first wall communicating with said blower outlet; said heater having an outlet at said first wall; a passage means in said casing communicating with said air delivery duct; a second wall of said casing having an opening therein; a refrigeration evaporator projected through said opening and disposed in said passage means in a path of air flowing from said blower and said heater to said delivery duct; and an evaporative cooler coupled to said casing and having a blower and an outlet disposed to force evaporatively cooled air into said delivery duct; and a damper alternately operable to shut off said cooler outlet and said heater relative to said air delivery duct.

6. In an air conditioner the combination of: a central casing; a conditioned air delivery duct therein; a blower having an inlet and an outlet; an air return duct communicating with said inlet of said blower, said blower outlet disposed at a first wall of said casing; a heater coupled to said casing and adjacent said first wall, said heater having an inlet at said first wall communicating with said blower outlet; said heater having an outlet at said first wall; a passage means in said casing communicating with said air delivery duct; a second wall of said casing having an opening therein; a refrigeration evaporator projected through said opening and disposed in said passage means in a path of air flowing from said blower and said heater to said delivery duct; and an evaporative cooler coupled to said casing and having a blower and an outlet disposed to force evaporatively cooled air into said delivery duct; and a damper alternately operable to shut off said cooler outlet and said heater relative to said air delivery duct; and a third wall of said casing disposed in opposed relation to said first wall and having an opening through which said evaporative cooler is disposed to deliver evaporatively cooled air to said air delivery duct.

7. In an air conditioner the combination of: a central casing; a conditioned air delivery duct therein; a blower having an inlet and an outlet; an air return duct communicating with said inlet of said blower, said blower outlet disposed at a first wall of said casing; a heater coupled to said casing and adjacent said first wall, said heater having an inlet at said first wall communicating with said blower outlet, said heater having an outlet at said first wall; a refrigeration evaporator in said casing disposed to receive air flowing therethrough from said blower and heater to said delivery duct; and an evaporative cooler coupled to said casing and having a blower and an outlet disposed to force evaporatively cooled air into said delivery duct; and a damper alternately operable to shut off air flow from said cooler outlet and said heater relative to said air delivery duct.

8. In an air conditioner the combination of: a central casing; a conditioned air delivery duct therein; a blower having an inlet and an outlet; an air return duct communicating with said inlet of said blower, said blower outlet disposed at a first wall of said casing; a heater coupled to said casing and adjacent said first wall, said heater having an inlet at said first wall communicating with said blower outlet, said heater having an outlet at said first wall; a refrigeration evaporator in said casing disposed to receive air flowing therethrough from said blower and heater to said delivery duct; and an evaporative cooler coupled to said casing and having a blower and an outlet disposed to force evaporatively cooled air into said delivery duct; and a damper alternately operable to shut off air flow from said cooler outlet and said heater relative to said air delivery duct; a refrigeration system coupled to said evaporator; a housing for said system secured to said casing means; said heater and said evaporative cooler also secured to said casing means.

9. In an air conditioner the combination of: a central casing; a conditioned air delivery duct therein; a blower having an inlet and an outlet; an air return duct communicating with said inlet of said blower, said blower outlet disposed at a first wall of said casing; a heater coupled to said casing and adjacent said first wall, said heater having an inlet at said first wall communicating with said blower outlet, said heater having an outlet at said first wall; a refrigeration evaporator in said casing disposed to receive air flowing therethrough from said blower and heater to said delivery duct; and an evaporative cooler coupled to said casing and having a blower and an outlet disposed to force evaporatively cooled air into said delivery duct; and air pressure operated means alternately disposed to shut off said outlet of said evaporative cooler and air flowing from said blower to said delivery duct.

10. In an air conditioner the combination of: a central casing; a conditioned air delivery duct therein; a blower having an inlet and an outlet; an air return duct communicating with said inlet of said blower, said blower outlet disposed at a first wall of said casing; a heater coupled to said casing and adjacent said first wall, said heater having an inlet at said first wall communicating with said blower outlet, said heater having an outlet at said first wall; a refrigeration evaporator in said casing disposed to receive air flowing therethrough from said blower and heater to said delivery duct; and an evaporative cooler coupled to said casing and having a blower and an outlet disposed to force evaporatively cooled air into said delivery duct; and air pressure operated means alternately disposed to shut off said outlet of said evaporative cooler and air flowing from said blower to said delivery duct; and detent means for holding said last mentioned means in alternate position.

11. In an air conditioner the combination of: a central casing; a conditioned air delivery duct therein; a blower having an inlet and an outlet; an air return duct communicating with said inlet of said blower, said blower outlet disposed at a first wall of said casing; a heater coupled to said casing and adjacent said first wall, said heater having an inlet at said first wall communicating with said blower outlet; said heater having an outlet at said first wall; a passage means in said casing communicating with said air delivery duct; a second wall of said casing having an opening therein; a refrigeration evaporator projected through said opening and disposed in said passage means in a path of air flowing from said blower and said heater to said delivery duct; and an evaporative cooler coupled to said casing and having a blower and an outlet disposed to force evaporatively cooled air into said delivery duct; and a filter in said passage means upstream of said evaporator; and a damper alternately operable to shut off air flow from said cooler outlet and said heater relative to said air delivery duct.

12. In an air conditioner the combination of: a heater having vertically extending heat exchange surfaces therein; a heater inlet and a heater outlet, both at one side of said heater; said heater inlet communicating with lower portions of said surfaces and disposed to receive air to be heated; a blower having an inlet and an outlet and disposed to force air through said heater; said heater outlet disposed above said heater inlet at said one side of said heater and adjacent to said heater inlet whereby air forced through said heater inlet makes a substantially 180 degree change in direction from said heater inlet to said heater outlet; a vertically disposed air delivery duct communicating with said heater outlet; a vertical return duct communication with said inlet of said blower, said delivery and return ducts contiguous with each other; casing means forming an air passage means between said heater outlet and said delivery duct; an evaporative cooler coupled to said casing means and having a blower and an air delivery opening communicating directly with said delivery duct in opposed relation to said passage, whereby air delivered into said delivery duct by said evaporative cooler is disposed to exert pressure in a direction opposite to that of air moving through said passage to said delivery duct; and a pivoted pressure operated damper disposed between said air passage and said evaporative cooler delivery opening whereby said damper is automatically closed over said evaporative cooler delivery opening when said first mentioned blower is operating and said evaporative cooler is not operating and whereby said damper is held closed between said passage and said delivery duct by air pressure from said evaporative cooler blower when it is operating and when said first mentioned blower is not operating.

13. In an air conditioner the combination of: a heater having vertically extending heat exchange surfaces therein; a heater inlet and a heater outlet at one side of said heater; said heater inlet communicating with lower portions of said surfaces and disposed to receive air to be heated; a blower having an inlet and an outlet and disposed to force air through said heater; said heater outlet disposed above said heater inlet at said one side of said heater and adjacent to said heater inlet, whereby air forced through said heater inlet makes a substantially 180 degree change in direction from said heater inlet to said heater outlet; a conditioned air delivery duct communicating with said heater outlet; a return duct communicating with said inlet of said blower; casing means forming an air passage between said heater outlet and said delivery duct; refrigeration means communicating with said blower and said passage; an evaporative cooler coupled to said casing means and having a blower and an air delivery opening communicating directly with said delivery duct in opposed relation to said passage, whereby air delivered into said air delivery duct by said evaporative cooler is disposed to exert pressure in a direction opposite to that of air moving through said passage to said delivery duct; and a pivoted pressure operated damper disposed between said air passage and said evaporative cooler delivery opening, whereby said damper is automatically closed over said evaporative cooler delivery opening when said first mentioned blower is operating and said evaporative cooler is not operating and whereby said damper is held closed between said passage and said delivery duct by air pressure from said evaporative cooler blower when it is operating and when said first mentioned blower is not operating.

14. In an air conditioner the combination of: a heater having vertically extending heat exchange surfaces therein; a heater inlet and a heater outlet, both at one side of said heater; said heater inlet communicating with lower portions of said surfaces and disposed to receive air to be heated; a blower having an inlet and an outlet and disposed to force air through said heater; said heater outlet disposed above said heater inlet at said one side of said heater and adjacent to said heater inlet whereby air forced through said heater inlet makes a substantially 180 degree change in direction from said heater inlet to said heater outlet; a vertically disposed air delivery duct communicating with said heater outlet; a vertical return duct communicating with said inlet of said blower, said delivery and return ducts contiguous with each other; casing means forming an air passage means between said heater outlet and said delivery duct; an evaporative cooler coupled to said casing means and having a blower and an air delivery opening communicating directly with said delivery duct in opposed relation to said passage, whereby air delivered into said delivery duct by said evaporative cooler is disposed to exert pressure in a direction opposite to that of air moving through said passage to said delivery duct; and a pivoted pressure operated damper disposed between said air passage and said evaporative cooler delivery opening whereby said damper is automatically closed over said evaporative cooler delivery opening when said first mentioned blower is operating and said evaporative cooler is not operating and whereby said damper is held closed between said passage and said delivery duct by air pressure from said evaporative cooler blower when it is operating and when said first mentioned blower is not operating; and detent means for holding said damper alternately in either of said closed positions with respect to said passage, said evaporative cooler delivery opening and said delivery duct.

References Cited by the Examiner
UNITED STATES PATENTS

| | | | |
|---|---|---|---|
| 1,986,538 | 1/1935 | Schimke | 126—110 |
| 1,994,184 | 3/1935 | Williams | 126—110 X |
| 1,996,927 | 4/1935 | Lake | 165—122 |
| 2,247,987 | 7/1941 | Carson | 165—126 X |
| 2,259,541 | 10/1941 | Ballard | 62—311 X |
| 2,599,594 | 6/1952 | Taylor | 165—121 X |
| 2,773,675 | 12/1956 | Wyckoff | 165—48 |
| 2,779,572 | 1/1957 | Holman | 165—48 |
| 2,961,220 | 11/1960 | Packard | 165—122 X |

ROBERT A. O'LEARY, *Primary Examiner.*

CHARLES SUKALO, *Examiner.*

A. W. DAVIS, *Assistant Examiner.*